Patented July 7, 1953

2,644,831

UNITED STATES PATENT OFFICE 2,644,831

ALKALI METAL AND AMMONIUM SULFATES OF HYDROXY ETHERS

Milton Kosmin, Dayton, Ohio, assignor to Monsanto Chemical Company, St. Louis, Mo., a corporation of Delaware No Drawing. Application April 16, 1951, Serial No. 221,317

3 Claims. (Cl. 260—458)

The present invention relates to compounds having high surface-activity in aqueous solutions and to processes for preparing the said compounds.

In my copending application Serial No. 171,560 filed June 30, 1950, now Patent No. 2,617,830, I have disclosed polyglycol ethers of 7-ethyl-2-methylundecanol-4 condensates. These products are produced by condensing ethylene oxide with 7-ethyl-2-methylundecanol-4. While the condensates thus obtained show very good detergency, they are not sufficiently soluble in water to permit the preparation of concentrated aqueous solutions. Hence they cannot be used for the preparation of liquid detergents having adequate sudsing properties.

I have now found that if at least 3, but less than 20 moles of ethylene oxide be condensed with 7-ethyl-2-methylundecanol-4, and the resulting hydroxy ethers are converted to alkali metal or ammonium sulfates there is obtained a series of very water-soluble products which exhibits very good wetting-out and detergency properties.

The present products are prepared by condensing ethylene oxide with 7-ethyl-2-methylundecanol-4 until at least 3 moles, but not in excess of 19 moles, have been condensed with the alcohol and then sulfating and neutralizing the resulting condensation product with an alkali metal or ammonium salt or hydroxide. The condensation may be carried out by mixing ethylene oxide either as gas or liquid with the alcohol and heating to a temperature of from 110 to 170° C. The condensation reaction is aided by the presence of a catalyst. For this purpose any alkaline materials, such as an alkali metal hydroxide or alcoholate may be used. The catalyst may be employed in relatively small amounts, usually from 0.5% to 1% being employed. The catalyst is added to the liquid alcohol at the beginning of the reaction. Sulfation of the alcohol-ethylene oxide condensate may be effected in known manner; for example by reaction with dilute or concentrated sulfuric acid, oleum, sulfur trioxide, chlorosulfonic acid, etc. The sulfuric acid esters thus obtained are then neutralized, i. e., converted to salts by treatment with an alkali metal or ammonium salt or hydroxide, e. g., sodium, potassium, lithium or ammonium hydroxide or carbonate.

The products so produced are alkali metal or ammonium sulfates of hydroxy ethers and are believed to have the structure:

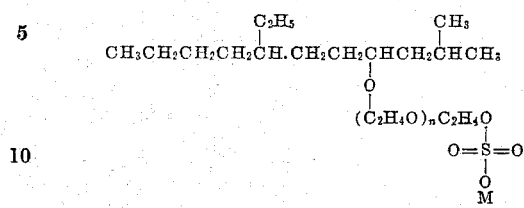

in which $n$ is an integer having a value of from 2 to 18 and M is selected from the class consisting of alkali metal and ammonium.

The following examples will further illustrate this invention:

Example 1

450.2 g. (2.1 moles) of 7-ethyl-2-methylundecanol-4 was placed in a glass flask, 4.5 g. of powdered KOH added and the contents then heated to 135° C. A stream of gaseous ethylene oxide was passed into the alcohol by means of a gas dispersing tube and the stream contained until 464 g. of ethylene oxide had combined. The mass became hot due to the exothermic reaction heat and the temperature was controlled by cooling the flask by the application of cold water to the exterior. In this way the temperature was maintained at 145-150° C. during the progress of the reaction. The condensate thus obtained was the pentaethylene glycol ether of 7-ethyl-2-methylundecanol-4.

194 g. of this condensation product was dissolved in approximately 1000 ml. of liquid sulfur dioxide and to this there was added, dropwise, 41.5 g. of sulfur trioxide during a period of about 8 minutes. The resulting solution was then stirred until most of the sulfur dioxide had evaporated. 300 ml. of 95% ethanol was then added and the whole was stirred under full water pump vacuum to remove sulfur dioxide. The product thus obtained consisted of an ethanol solution of the sulfated pentaethylene glycol ether of 7-ethyl-2-methylundecanol-4.

A portion of the sulfated product obtained above was neutralized with 40% aqueous sodium hydroxide. The ethanol was then stripped from the neutralized material, and the product was then dried in a stirred reactor at a pot temperature of 50–55° C. at 25–30 mm. of Hg pressure.

The dried product was the substantially pure sodium salt of sulfated pentaethylene glycol ether of 7-ethyl-2-methylundecanol-4.

Example 2

A portion of the pentaethylene glycol ether of 7-ethyl-2-methylundecanol-4 of Example 1, weighing 165 g., was dissolved in 50 ml. of carbon tetrachloride and to the resulting solution there was added dropwise 76 g. of 100% sulfuric acid at a temperature of 30–33° C. and during a period of 20 minutes. The mixture was then stirred for 1.75 hours, 20 ml. of water and 100 ml. of ethanol were added and the resulting solution was neutralized with 40% aqueous sodium hydroxide. Addition of 600 ml. of ethanol to the neutralized product precipitated the sodium sulfate formed in the neutralization. This was filtered off. The water and ethanol were then stripped from the filtrate and the remainder was dried at 50° C./30 mm. of Hg pressure.

The dried product was the sodium salt of sulfated pentaethylene glycol ether of 7-ethyl-5-methylundecanol-4.

Example 3

Relative detergency may be measured by any quantitative method; however for the purpose of evaluating the present and related products I have used the method described by Jay C. Harris in Soap and Sanitary Chemicals for August and September, 1943. By the application of this method it is possible to evaluate the detergency of a product in terms of any standard detergent. For convenience I have compared the detergency of the present and related products with the detergency of Gardinol WA, which is a commercial detergent produced by sulfating the alcohols derived by hydrogenation of coconut oil fatty acids.

The detergency of the products of Examples 1 and 2 and related products as determined by the Harris method is illustrated in the following table:

| Product Tested | Detergency, percent of Gardinol | |
|---|---|---|
| | 50 p. p. m. | 300 p. p. m. |
| Example 1 | 100 | 92 |
| Example 2 | 102 | 95 |
| Sodium 2-butyloctanol-1 sulfate | 37 | 30 |
| Sodium salt of sulfated pentaethylene glycol ether of 5-ethylnonanol-2 | 73 | 49 |

The speed of wetting, as measured by the Draves test of the products of Examples 1 and 2 when dissolved in water to form solutions of the indicated concentrations gave the values shown below. Similarly obtained values for a related product are included for purposes of comparison.

| Product Tested | Draves Wetting (Seconds at percent concentration) | | | |
|---|---|---|---|---|
| | 0.5 | 0.25 | 0.125 | 0.062 |
| Example 1 | 2.1 | 5.0 | 12.6 | 43.3 |
| Example 2 | 1.9 | 4.3 | 11.6 | 21.0 |
| Sodium salt of sulfated pentaethylene glycol ether of 5-ethylnonanol-2 | 3.0 | 7.9 | 45.3 | 1804 |

Evaluation of the foaming properties of the products of Examples 1 and 2 as measured by the Ross-Miles lather test, gave the following values:

| Product Tested | Ross-Miles Lather Heights (cm.) | | | |
|---|---|---|---|---|
| | 50 p. p. m. | | 300 p. p. m. | |
| | At Once | 5 min. | At Once | 5 min. |
| Example 1 | 16.0 | 13.8 | 13.0 | 10.5 |
| Example 2 | 14.7 | 12.5 | 11.4 | 8.0 |
| Sodium salt of sulfated pentaethylene glycol ether of 5-ethylnonanol-2 | 10.6 | 3.0 | 9.5 | 2.0 |

What I claim is:

1. Compounds having the general formula

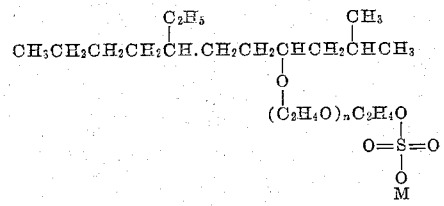

in which $n$ is an integer having a value of from 2 to 18 and M is selected from the class consisting of alkali metal and ammonium.

2. Compounds having the general formula

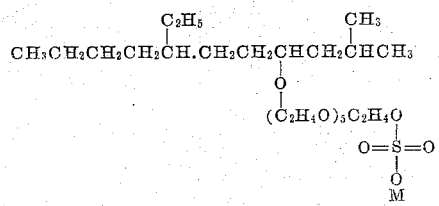

in which M is selected from the class consisting of alkali metal and ammonium.

3. Compounds having the general formula

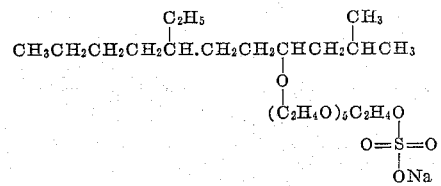

MILTON KOSMIN.

References Cited in the file of this patent

UNITED STATES PATENTS

| Number | Name | Date |
|---|---|---|
| 1,970,578 | Schoeller et al. | Aug. 21, 1934 |
| 2,174,761 | Schuette | Oct. 3, 1939 |
| 2,212,521 | Harris | Aug. 27, 1940 |
| 2,549,437 | De Groote | Apr. 17, 1951 |

FOREIGN PATENTS

| Number | Country | Date |
|---|---|---|
| 810,382 | France | Mar. 20, 1937 |